(12) United States Patent
Song (10) Patent No.: US 9,172,899 B2
(45) Date of Patent: Oct. 27, 2015

(54) METHOD AND APPARATUS FOR DETERMINING THAT RECEIVED BROADCASTING SIGNALS FROM DIFFERENT INPUT PORTS ARE THE SAME CONTENT

(75) Inventor: Seonggeun Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 13/384,400

(22) PCT Filed: Dec. 23, 2009

(86) PCT No.: PCT/KR2009/007703
§ 371 (c)(1),
(2), (4) Date: Jan. 17, 2012

(87) PCT Pub. No.: WO2011/010777
PCT Pub. Date: Jan. 27, 2011

(65) Prior Publication Data
US 2012/0120318 A1     May 17, 2012

(30) Foreign Application Priority Data
Jul. 22, 2009    (KR) ........................ 10-2009-0067031

(51) Int. Cl.
*G06F 3/00*        (2006.01)
*H04N 5/445*     (2011.01)
(Continued)

(52) U.S. Cl.
CPC ............ *H04N 5/44543* (2013.01); *H04N 5/76* (2013.01); *H04N 21/235* (2013.01); *H04N 21/4263* (2013.01); *H04N 21/435* (2013.01); *H04N 21/4334* (2013.01); *H04N 21/4345* (2013.01);
(Continued)

(58) Field of Classification Search
CPC ............ H04N 21/482; H04N 21/4821; H04N 21/4823; H04N 21/4825; H04N 21/4826; H04N 21/4828; H04N 21/4622; G11B 27/34; G06F 3/0481
USPC ............... 725/139, 151, 38–61; 715/700, 719
See application file for complete search history.

(56) References Cited

U.S. PATENT DOCUMENTS 5,900,916 A * 5/1999 Pauley ............................. 725/59
8,332,893 B2 * 12/2012 Dhodapkar et al. ............ 725/49
(Continued)

FOREIGN PATENT DOCUMENTS

JP         2008-278413     11/2008
KR    10-2002-0032802     5/2002
(Continued)

OTHER PUBLICATIONS

International Search Report issued in PCT Application No. PCT/KR2009/007703 dated Jun. 23, 2010.
(Continued)

*Primary Examiner* — Farzana Hossain
(74) *Attorney, Agent, or Firm* — KED & Associates, LLP (57) ABSTRACT

The present invention relates to a method and an apparatus for receiving broadcasting signals. The method comprises the steps of: obtaining a channel number of contents included in a first broadcasting signal; and allocating a channel number into contents included in a second broadcasting signal by using the obtained channel number. The method is characterized in that the same contents included respectively in the first and second broadcasting signals have the same channel number.

17 Claims, 4 Drawing Sheets

(51) Int. Cl.
  *H04N 5/76* (2006.01)
  *H04N 21/235* (2011.01)
  *H04N 21/426* (2011.01)
  *H04N 21/433* (2011.01)
  *H04N 21/434* (2011.01)
  *H04N 21/435* (2011.01)
  *H04N 21/462* (2011.01)
  *H04N 21/482* (2011.01)

(52) U.S. Cl.
  CPC ......... *H04N 21/4622* (2013.01); *H04N 21/482* (2013.01); *H04N 21/4823* (2013.01)

(56) References Cited

U.S. PATENT DOCUMENTS

| | | | |
|---|---|---|---|
| 2006/0035610 A1* | 2/2006 | Potrebic | 455/178.1 |
| 2006/0150214 A1* | 7/2006 | Ramraz et al. | 725/44 |
| 2009/0019479 A1* | 1/2009 | Kwak et al. | 725/38 |
| 2009/0094646 A1* | 4/2009 | Walter et al. | 725/48 |
| 2009/0165066 A1 | 6/2009 | Brouda | |

FOREIGN PATENT DOCUMENTS

| | | |
|---|---|---|
| KR | 10-2006-0060048 | 6/2006 |
| KR | 10-2008-0108700 A | 12/2008 |
| KR | 10-2009-0007048 A | 1/2009 |
| KR | 2009-0039041 A | 4/2009 |
| WO | WO 2008/153310 A1 | 12/2008 |

OTHER PUBLICATIONS

European Search Report for Application No. 09847616.1 dated Mar. 10, 2015.
DVB Organization: "CM-AVC0133 cm0848 CRs Hybrid Broadcast-Broadband Services.pdf", DVB, Digital Video Broadcasting, C/O EBU-17A Ancienne Route—CH-1218 Grand Saconnex, Geneva-Switzerland, May 17, 2008, XP017826255, pp. 1-19.
Korean Office Action issued in Application No. 10-2009-0067031 dated May 21, 2015.

* cited by examiner

| CHANNEL NAME | CHANNEL NUMBER | FREQUENCY BAND |
|---|---|---|
| MBC | 11 | 198-204Mhz |
| KBS1 | 9 | 186-192Mhz |
| KBS2 | 7 | 174-180Mhz |
| SBS | 6 | 82-88Mhz |

FIG.6

| CONTENT NAME | IP ADDRESS |
|---|---|
| MBC | 111.111.11.111 |
| KBS1 | 222.222.22.222 |
| KBS2 | 333.333.33.333 |
| XTM | 444.444.44.444 |

FIG.7

| CHANNEL NUMBER | CONTENT | POSITION |
|---|---|---|
| 6 | SBS | 82-88Mhz |
| 7 | KBS2 | 174-180Mhz |
| | | 333.333.33.333 |
| 9 | KBS1 | 186-192Mhz |
| | | 222.222.22.222 |
| 11 | MBC | 198-204Mhz |
| | | 111.111.11.111 |
| 12 | XTM | 444.444.44.444 |

METHOD AND APPARATUS FOR DETERMINING THAT RECEIVED BROADCASTING SIGNALS FROM DIFFERENT INPUT PORTS ARE THE SAME CONTENT

This application is a U.S. National Stage of International Application No. PCT/KR09/07703, filed Dec. 23, 2009, which claims priority from Korean Patent Application 10-2009-0067031, filed Jul. 22, 2009.

TECHNICAL FIELD

The present disclosure relates to a method and apparatus for receiving broadcasting signals.

BACKGROUND ART

In related art, apparatuses for receiving broadcasting signals receive data streams including broadcasting signals, extract video and audio data streams corresponding to channels users want by using service information included in the received data streams, and outputs the video and audio data streams to a display device.

For example, Digital Television receivers can convert received broadcasting signals into digital codes for screen playback with high quality and have several additional functions. In digital broadcasting, image and sound streams are compressed into digital information and then broadcast, and also system information and program information are compressed conforming to a program and system information protocol (PSIP) and then broadcast.

DISCLOSURE OF THE INVENTION

Technical Problem

Embodiments provide a method and apparatus for receiving broadcasting signals, thereby enhancing convenience of channel selection for a specific content.

Technical Solution

In one embodiment, a method of receiving broadcasting signals includes: obtaining a channel number of a content included in a first broadcasting signal; and using the obtained channel number, allocating the channel number to a content included in a second broadcasting signal, wherein the same content each included in the first and second broadcasting signals has the same channel number.

In another embodiment, a method of receiving broadcasting signals includes: receiving a channel number; searching for a content corresponding to the received channel number among contents included in a first broadcasting signal; and when the searched content is included in a second broadcasting signal, receiving the second broadcasting signal to obtain the content.

In a further embodiment, an apparatus for receiving broadcasting signals includes: a first receiving unit receiving a first broadcasting signal; a second receiving unit receiving a second broadcasting signal; a channel information extraction unit extracting channel information from the received first broadcasting signal and obtaining a channel number of each of contents included in the first broadcasting signal; a channel information allocation unit allocating a channel number of the first content to a content included in the second broadcasting signal when the content included in the second broadcasting signal is the same as the first content included in the first broadcasting signal; and a storage unit store a plural contents each corresponding to at least one of the channel number obtained by the channel information extraction unit and the channel number allocated by the channel information allocation unit.

In a still further embodiment, a display device includes the apparatus.

Advantageous Effects

According to embodiments of the present invention, a plurality of broadcasting signals which are received through different input ports or communication methods constitute integrated channel information, thereby easily and fast selecting the content desired by a user. And also, the same channel number is allocated to the same content included in different broadcasting signals, thereby easily selecting contents in various broadcasting signals with channel numbers to which a user is accustomed.

MODE FOR CARRYING OUT THE INVENTION

Hereinafter, a method and apparatus for receiving broadcasting signals according to embodiments will now be described with reference to the accompanying drawings.

Figure 1:
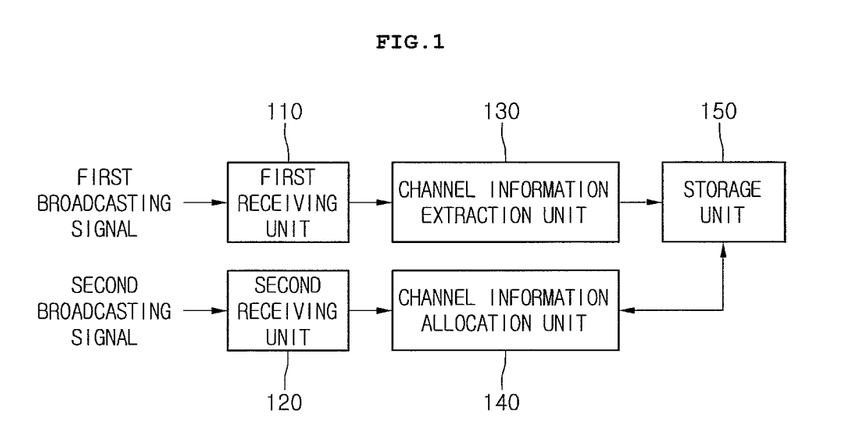
FIG. 1 is a block diagram illustrating a first embodiment of a configuration of an apparatus for receiving broadcasting signals.

FIG. 1 is a block diagram illustrating a first embodiment of a configuration of an apparatus for receiving broadcasting signals. The apparatus may include a first receiving unit 110, a second receiving unit 120, a channel information extraction unit 130, a channel information allocation unit 140, and a storage unit 150.

Referring to FIG. 1, the first receiving unit 110 receives a first broadcasting signal transmitted from the outside, and the second receiving unit 120 receives a second broadcasting signal transmitted from the outside. That is, the first and second broadcasting signals may be received through different input ports included in the apparatus for receiving broadcasting signals, respectively.

For example, the apparatus for receiving broadcasting signals may include a plurality of input ports, through which the apparatus may receive terrestrial broadcasting signals, cable broadcasting signals, satellite broadcasting signal, or IPTV broadcasting signal.

The first and second broadcasting signals may be received by the apparatus in different communication methods.

For example, the first broadcasting signal may be provided from terrestrial broadcasting, cable broadcasting, or satellite broadcasting. In this case, a content may be allocated and received for each frequency band. For this, the first receiving unit 110 may include a tuner.

Also, the second broadcasting signal may be an IPTV broadcasting signal. In this case, the content may be allocated for each uniform resource locator (URL) or internet protocol (IP) address. For this, the second receiving unit 120 may include an internet communication unit for accessing the Internet with URL or IP address corresponding to the content desired by a user, more particularly, a network interface card (NIC).

As another embodiment, the first receiving unit 110 may receive the first broadcast signal in wired communication methods, and the second receiving unit 120 may receive the second broadcasting signal in wireless communication methods.

According to an embodiment, when the apparatus for receiving broadcasting signals receives the first and second broadcasting signals in different communication methods or through input ports. The same channel number is allocated to the content included in the first and second broadcasting signals in common, thereby enhancing user convenience for content selection.

Also, the first broadcasting signal received by the first receiving unit 110 may include channel information about contents. The channel information extraction unit 130 may extract the channel information from the received first broadcasting signal and store the channel information in the storage unit 150.

For example, the channel information extracted by the channel information extraction unit 130 may include information about a channel name, channel number, and frequency band of each of contents included in the first broadcasting signal. The channel name, channel number, and frequency band obtained by the channel information extraction unit 130 may be stored in the storage unit 150 for each of the contents.

The second broadcasting signal 120 may not include the channel information about the contents. In this case, the channel information allocation unit 140 may allocate a channel number to the content included in the second broadcasting signal and store the allocated channel number in the storage unit 150.

Thus, the storage unit 150 may store channel information about each of the contents included in the first and second broadcasting signals, for example channel number.

According to an embodiment, the channel information allocation unit 140 may allocate a channel number to the content of the second broadcasting signal, using the content channel number of the first broadcasting signal which is obtained by the channel information extraction unit 130.

For example, when the first and second broadcasting signals include a first content in common, the channel information allocation unit 140 may allocate the same channel number (N) as that of the first content obtained by the channel information extraction unit 130 to the first content included in the second broadcasting signal.

In this case, the channel number (N) may correspond to the first content included in the first broadcasting signal and also the first content included in the second broadcasting signal, and the correspondence relation between the channel number and the content may be stored in the storage unit 150.

Also, when a user selects the channel number (N), one of the first and second broadcasting signals is selectively received according to a predetermined priority, and thus the first content can be obtained.

Like this, the same channel number may be allocated to the content included in the first and second broadcasting signals in common, thereby managing and selecting, only by inputting a channel number, a plural of content received through different input ports and in communication manners An embodiment was described as an example of receiving the first and second broadcasting signals through the first and second receiving unit 110 and 120, respectively, and is not limited thereto. That is, the apparatus for receiving a broadcasting signal according to an embodiment may receive 3 or more broadcasting signals through different input port or in different communication manners, where content included in the broadcasting signals in common may have the same channel number.

Figure 2:
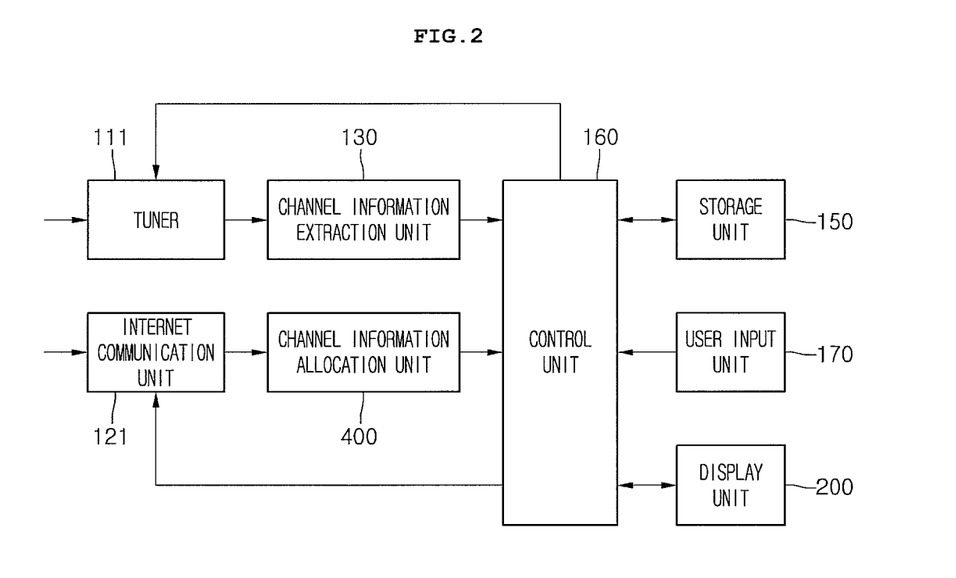
FIG. 2 is a block diagram illustrating a second embodiment of a configuration of an apparatus for receiving broadcasting signals.

FIG. 2 is a block diagram illustrating a second embodiment of a configuration of an apparatus for receiving broadcasting signals. The apparatus may include a tuner 111, a channel information extraction unit 130, a channel information allocation unit 140, a storage unit 150, and a control unit 160.

Referring to FIG. 2, the tuner 111 selects and outputs a broadcasting signal with a frequency band corresponding to a specific channel in a first broadcasting signal that is received through an antenna or cable. The first broadcasting signal may have content allocated for each frequency bands, and for example, may include at least one of terrestrial broadcasting, cable broadcasting, and satellite broadcasting. Also, the content included in the first broadcasting signal may be analog or digital data.

The channel information extraction unit 130 extracts channel information from a signal corresponding to the selected channel in the first broadcasting signals which are output from the tuner 111. For example, the channel information extraction unit 130 may extract channel information from a broadcasting signal that is output from the tuner 111. For example, the channel information may include the channel name, the channel number, and information about the corresponding frequency band for each channel.

The internet communication unit 121 may access the Internet and then receive a second broadcasting signal including content corresponding to a specific URL or IP address, and to do so, include a network interface card (NIC).

Also, the internet communication unit 121 may receive summary information about the content provided through the Internet, and the channel information allocation unit 140 may allocate a channel number to each of the plurality of contents, using the received summary information.

As above, the channel information allocation unit 140 may allocate a channel number to content included in the second broadcasting signals, using the channel number obtained through the channel information extraction unit 130, and more particularly, allocate the same channel number to content included in the first and second broadcasting signals in common.

Whether specific content is included in the first and second broadcasting signals in common may be determined using the channel information extracted from the channel information extraction unit 130 and the content summary information received from the internet communication unit 121.

For example, the control unit 160 may control the tuner 111 by outputting information about a frequency band of a channel selected by the tuner 111 and may control operations of the internet communication unit 121 by outputting information about an IP address or URL of a internet server which is accessed by the internet communication unit 121.

Also, the control unit 160 may control operations of the channel information extraction unit 130 and the channel information allocation unit 140 and store the channel information extracted by the channel information extraction unit 130 and the channel number allocated by the channel information allocation unit 140 in the storage unit 150.

A display device according to an embodiment may include the apparatus for receiving broadcasting signals having a configuration such as described above. For example, the display device may include a tuner 111, an internet communication unit 121, a channel information extraction unit 130, a channel information allocation unit 140, a storage unit 150, a control unit 160, a user input unit, and a display unit 200.

Hereinafter, a method of receiving broadcasting signals according to embodiments will now be described in more detail with reference to FIGS. 3 to 9.

Figure 3:
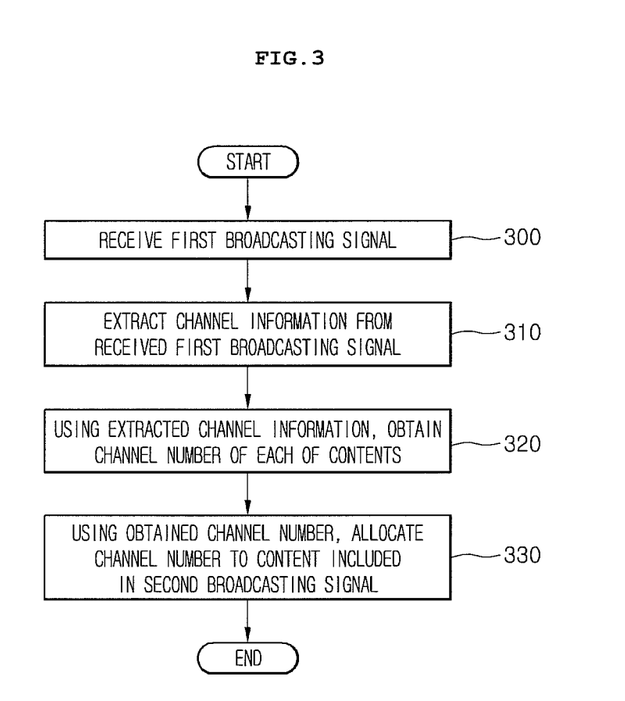
FIG. 3 is a flow chart illustrating a first embodiment of a method of receiving broadcasting signals.

FIG. 3 is a flow chart illustrating a first embodiment of a method of receiving broadcasting signals. The method illustrated in FIG. 3 will be described in connection with the block diagram shown in FIG. 2.

Referring to FIG. 3, the apparatus for receiving broadcasting signals receives a first broadcasting signal through an antenna or cable, selects the first broadcasting signal with a tuner 111, and outputs the first broadcasting signal to the channel information extraction unit 130 (operation 300).

The channel information extraction unit 130 extracts channel information from the received first broadcasting signal (operation 310), and using the extracted channel information, obtains a channel number of each of the plurality of contents included in the first broadcasting signal (operation 320). The channel numbers may be stored in the storage unit 150, corresponding to the channel name and frequency band.

For example, for digital broadcasting, video and audio data are compressed into digital information, and system information and program information are compressed conforming to a program and system information protocol (PSIP). The compressed system information and program information and the compressed video and audio data may be generated as a data stream, and the data stream may be transmitted to the apparatus for receiving broadcasting signals.

The PSIP is a protocol for terrestrial and cable broadcastings, which defines program information and system information such that signals encoded according to the moving picture experts group (MPEG) standard are parsed to provide various information about a program.

More specifically, the channel information extraction unit 130 extracts service information from the data stream included in the first broadcasting signal and extracts various channel information from the service information. The apparatus for receiving broadcasting signals may include an A/V processing unit (not shown) decoding video and audio data extracted from the data stream.

The service information (SI) may include Service Description Table (SDT), Program Association Table (PAT), and Program Map Table (PMT).

The service description table (SDT) may include broadcast service channels of media channel being broadcast currently and information regarding the channels. A user may search for and select a channel with reference to the service description table (SDT).

Also, the may include a broadcast channel ID (identification) being broadcast currently and a packet identification description (PID) of the program map table (PMT) including additional information regarding the broadcast channel, i.e. PMT PID being the PID of the broadcast channel.

The program map table (PMT) may include a packet identification description (PID) of an video or audio data stream corresponding to the PMT PID.

The channel information extraction unit 130 may extract service information (SI), for example, the service description table (SDT), program association table (PAT), and program map table (PMT), from a signal output from the tuner 111, and using the extracted service information (SI) form a channel map.

Figure 5:
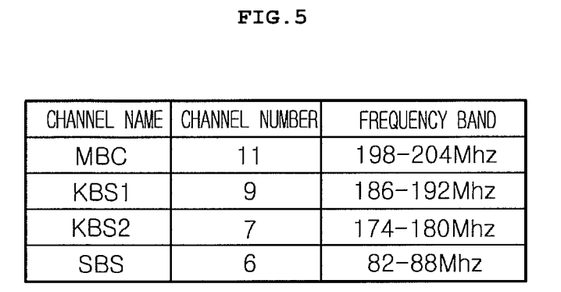
FIG. 5 is a view illustrating an embodiment of channel information obtained from a first broadcasting signal.

FIG. 5 is a view illustrating an embodiment of a channel map formed using the channel information extracted from the first broadcasting signal.

Referring to FIG. 5, the first broadcasting signal may include the plurality of contents, for example, MBC (Munhwa Broadcasting Corporation), KBS1 (Korean Broadcasting System 1), KBS2 (Korean Broadcasting System 2), and SBS (Seoul Broadcasting System) broadcastings. A channel map stored in the storage unit 150 may be configured with the channel name, channel number, and frequency band of each of the contents.

For example, MBC broadcasting content having the channel name as the 'MBC' corresponds to the channel number 11. When the channel number 11 is selected, the tuner 111 selects and outputs a channel signal corresponding to a frequency band of 198-204 MHz in the received first broadcasting signal.

More specifically, when a user select the channel number 11 using the user input unit 170, the control unit 160 receiving a signal from the user input unit 170 may control the operations of the tuner 111 such that the storage unit 150 is searched for the frequency band corresponding to the received channel number 11 and a signal with a frequency band of 198-204 MHz is selected.

After channel numbers for the contents of the first broadcast signal are obtained in operation 320, the channel information allocation unit 140 allocates a channel number to content included in the second broadcasting signal using the channel numbers obtained in operation 320 (operation 330).

The internet communication unit 121 accesses the Internet and then receives summary information about each of the plurality of contents provided through the Internet. The summary information about the plurality of contents may be provided from each server providing a content or from one server integratedly.

The URL or IP address of the server providing the content summary information may be stored in the storage unit 150. The control unit 160 may control the internet communication unit 121 to access an internet server having the URL or IP address stored in the storage unit 150.

The content summary information may be provided in a Really Simple Syndication (RSS) data format or ATOM data format. That is, the second broadcasting signal received by the internet communication unit 121 may include RSS data or ATOM data having the content summary information.

RSS data or ATOM data of the second broadcasting signal may include a content name, URL or IP address where content is positioned, thumbnail image of the content.

Figure 6:
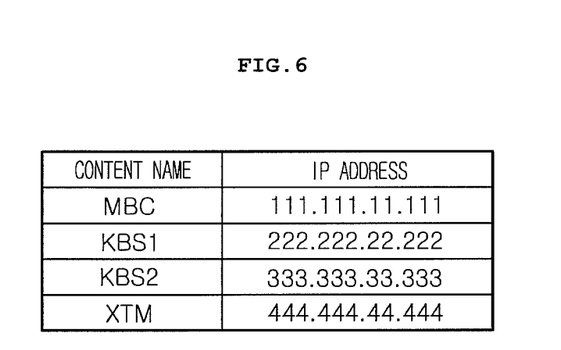
FIG. 6 is a view illustrating an embodiment of content information obtained from a second broadcasting signal.

FIG. 6 is a view illustrating an embodiment of content summary information obtained from the second broadcasting signal.

Referring to FIG. 6, a plurality of contents that can be received through the Internet may include MBC, KBS1, KBS2, and XTM broadcastings. The content summary information may include the content name and IP address of each of the plurality of contents.

For example, KBS1 broadcasting content having the content name as 'KBS1' corresponds to the IP address '111.111.11.111'. When 'KBS1' is selected, the internet communication unit 121 may access an internet server corresponding to the IP address '111.111.11.111' and receive a second broadcasting signal including the KBS1 broadcasting content.

The content summary information as shown in FIG. 6 may be stored in the storage unit 150.

According to an embodiment, the channel information allocation unit 140 may allocate a channel number to the content included in the second broadcasting signal, using the channel number for the content of the first broadcasting signal which is obtained in operation 320 and the content summary information of the second broadcasting signal received from the internet communication unit 121.

The channel number acquisition and allocation tasks as described with reference to FIG. 3 may be performed upon a user's request for channel search through the user input unit 170 or periodically.

Figure 4:
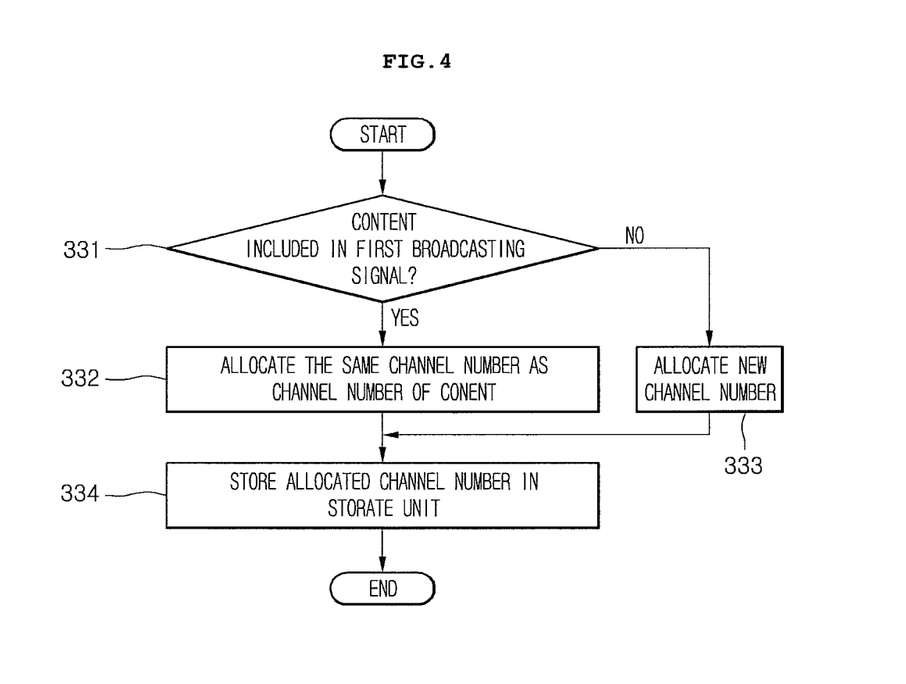
FIG. 4 is a flow chart illustrating an embodiment of the allocating of a channel number shown in FIG. 3.

FIG. 4 is a view illustrating an embodiment of a method of allocating a channel number to the content of the second broadcast signal in operation 330.

Referring to FIG. 4, the channel information allocation unit 140 determines whether a plurality of contents that can be received through the Internet are included in the first broadcasting signal (operation 331).

For example, the channel information allocation unit 140 may check contents that can be received with the second broadcasting signal, using the content summary information received by the internet communication unit 121, and determine whether the content of the second broadcasting signal are included in the first broadcasting signal, using the channel information about the first broadcasting signal that is stored in the storage unit 150.

As a result of the determination, when the content of the second broadcasting signal is included in the first broadcasting signal, the channel information allocation unit 140 allocates the same channel as the channel number of the content obtained in operation 320 to the content of the second broadcasting signal (operation 332).

In contrast, when the content of the second broadcasting signal is not included in the first broadcasting signal, the channel information allocation unit 140 allocates a new channel number that is not obtained in operation 320 to the content of the second broadcasting signal (operation 333).

The control unit 160 stores channel numbers allocated in operation 332 or 333 in the storage unit 150 (operation 334).

Referring to FIGS. 5 and 6, MBC, KBS1, and KBS2 broadcastings of contents that can be received through the Internet are included in the first and second broadcasting signals in common, and XTM broadcasting is included only in the second broadcasting signal. SBS broadcasting is a content included only in the first broadcasting signal.

For example, comparing the channel names of the channel map as shown in FIG. 5 with the content names of the content summary information as shown in FIG. 6, whether a specific content is included in the first and second broadcasting signals in common may be determined.

Figure 7:
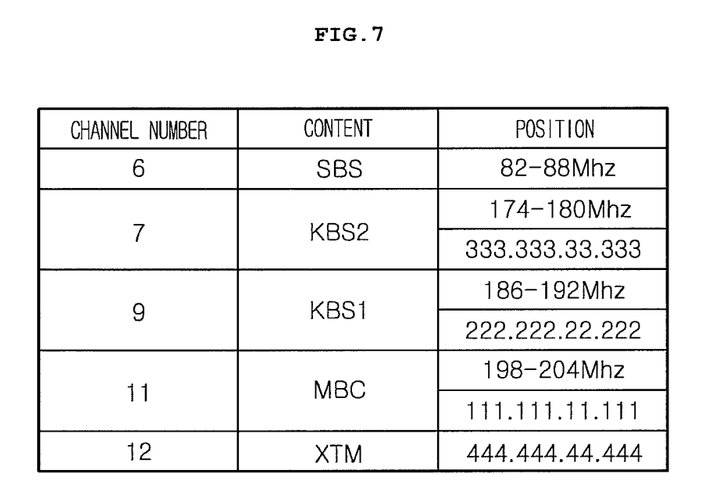
FIG. 7 is a view illustrating an embodiment of a method of allocating a channel number to the second broadcasting signal.

Referring to FIG. 7, the same channel number may be allocated to MBC, KBS1, and KBS2 broadcastings which are included in the first and second broadcasting signals.

That is, the channel number 11, the channel number of 'MBC', may be allocated to KBS2 broadcasting of the second broadcasting signal, and thus the frequency band (174-180 MHz) of the first broadcasting signal and the IP address (333.333.33.333) of the second broadcasting signal may correspond to the channel number 11.

For SBS broadcasting, which exists only in the first broadcasting signal, only the frequency band (82-88 MHz) of the first broadcasting signal may correspond to the channel number 6.

XTM broadcasting, which exits only in the second broadcasting signal, i.e., which can be received only through the Internet, may receive the allocation of a new channel number 12 not allocated to other contents. Also, only the IP address (444.444.44.44) of the internet server where XTM broadcasting is positioned may correspond to the channel number 12.

The integrated channel information about the first and second broadcasting signals as shown in FIG. 7 may be stored in the storage unit 150.

Figure 8:
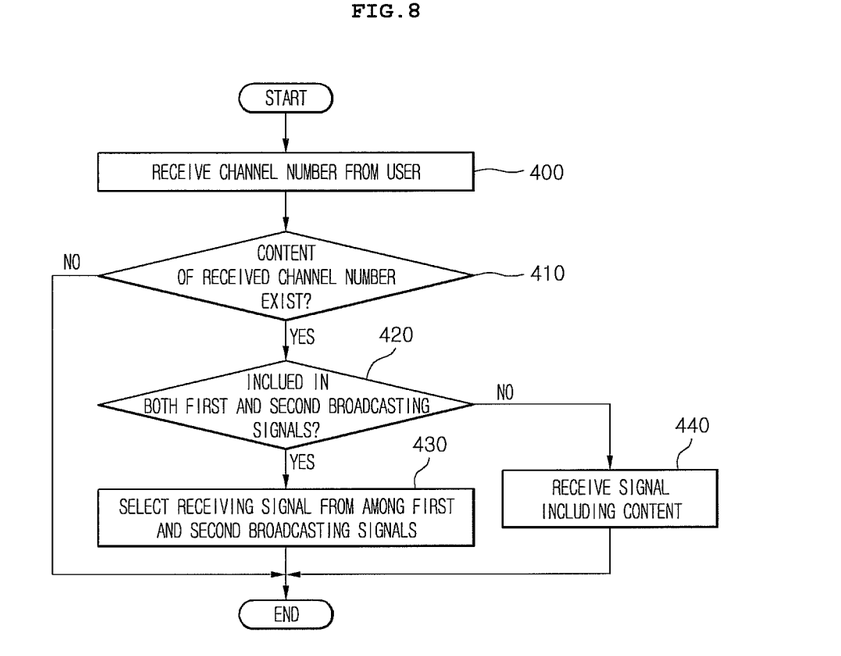
FIG. 8 is a flow chart illustrating a second embodiment of a method of receiving broadcasting signals.

FIG. 8 is a flow chart illustrating a second embodiment of a method of receiving broadcasting signals. The method illustrated in FIG. 8 will be described in connection with a block diagram shown in FIG. 2.

Referring to FIG. 8, a user input unit 170 receives the channel number desired by a user (operation 400).

The control unit 160 searches for channel information stored in the storage unit 150 and determines whether the content corresponding to the received channel number exists in the first or second broadcasting signal (operation 410).

When there exists the content corresponding to the received channel number, the control unit 160 determines whether the searched content is included in the first and second broadcasting signals in common (operation 420). In contrast, when there does not exist the content corresponding to the received channel number, channel switching may not be performed but an error message for channel number input may be output additionally.

Referring to FIG. 7, when a user selects channel number 7, the control unit 160 may search the storage unit 150 and determine whether KBS2 broadcasting, the content corresponding to the channel number 7, is included in the first and second broadcasting signals in common.

When a user selects channel number 6, the control unit 160 may determine whether SBS broadcasting, the content corresponding to the channel number 6, is included only in the first broadcasting signal.

When a user selects channel number 12, the control unit 160 may determine whether XTM broadcasting, the content corresponding to the channel number 12, is included only in the second broadcasting signal, that is, can be received only through the Internet.

If the content corresponding to the received channel number is included in the first and second broadcasting signals in common, then the control unit 160 selects and then receives one of the first and second broadcasting signals (operation 430).

For example, the control unit 160 may select one of the first and second broadcasting signals for receiving the content according to a user input or predetermined priority.

As a first embodiment, the control unit 160 enables the display unit 200 to display a screen where the content corresponding to the channel number input by the user exits in the first and second broadcasting signals. The control unit 160 enables the user to select one of the first and second broadcasting signals for receiving the content through the user input unit 170.

Referring to FIG. 7, when a user selects channel number 9, the control unit 160 enables the display unit 200 to indicate to a user that there exist terrestrial KBS1 broadcasting and IPTV real-time KBS broadcasting. The control unit 160 enables the user to select one of terrestrial KBS1 broadcasting and IPTV real-time KBS broadcasting through the user input unit 170.

According to a second embodiment, the control unit 160 may priorly select the currently received broadcasting signal from among the first and second broadcasting signals as a broadcasting signal for receiving the content.

For example, when the apparatus for receiving broadcasting signals is receiving the first broadcasting signal, the control unit 160 may select the first broadcasting signal from among the first and second broadcasting signals as a broadcasting signal for receiving the content corresponding to the channel number input by the user. In contrast, when the apparatus is receiving the first broadcasting signal, the control unit 160 may select the second broadcasting signal as a broadcasting signal for receiving the content corresponding to the channel number input by the user.

Referring to FIG. 7, when the apparatus is receiving the second broadcasting including IPTV real time MBC broadcasting through the Internet and a user select channel number 7, the control unit 160 may select and receive the second broadcasting signal from among the first and second broadcasting signals to obtain KBS2 broadcasting.

According to a third embodiment, the control unit 160 may priorly select a broadcasting signal with the content of high resolution from among the first and second broadcasting signals.

For example, when a user selects channel number 7, the control unit 160 may select the second broadcasting signal with the content of high resolution from among the first broadcasting signal including KBS broadcasting of HD resolution and the second broadcasting signal including KBS broadcasting of Full HD resolution.

According to a fourth embodiment, the priorities of the first and second broadcasting signals may be preset.

For example, a user may preset IPTV real time broadcasting as having a priority, and thus when a user selects channel number 11, the control unit 160 may select the second broadcasting signal from among the first and second broadcasting signals to receive MBC broadcasting.

Thereafter, the tuner 111 or internet communication unit 121 receives the selected broadcasting signals of the first and second broadcasting signals (operation 440). That is, the control unit 160 may output a control signal to the tuner 111 or the internet communication unit 121 for the selected broadcasting signal to be received in operation 430.

More specifically, when the first broadcasting signal is selected in operation 430, the control unit 160 provides information about a frequency band corresponding to the content of the input channel number to the tuner 111 and allows the tuner 111 to select the channel corresponding to the content.

Also, when the second broadcasting signal is selected in operation 430, the control unit 160 provides information about an IP address corresponding to the content of the input channel number to internet communication unit 121 and allows the content to be downloaded to the internet communication unit 121.

Referring to FIG. 7, when the second broadcasting signal is selected as a receiving signal for KBS1 broadcasting having channel number 9 input by a user, the control unit 160 provides information about the IP address (222.222.22.222) corresponding to the channel number 9 to the internet communication unit 121, and the internet communication unit 121 may access the Internet with the IP address (222.222.22.222) and then receive IPTV real time KBS1 broadcasting.

When a user inputs the channel number corresponding to the currently watched content, that is, the immediately previous channel number again or when a user inputs a key for broadcasting signal switching, the broadcasting signal that is not selected in operation 430 from among the first and second broadcasting signals may be received, thus obtaining the content.

Referring to FIG. 7, when a user inputs the channel number 7 again or key for broadcasting signal switching while the user selects channel number 7 to receive the first broadcasting signal and watch terrestrial KBS2 broadcasting, the control unit 160 may select and receive the second broadcasting signal from among the first and second broadcasting signals. Thus, the internet connection unit 121 may access the internet server corresponding to the IP address (333.333.33.33) of KBS2 broadcasting and then receive the second broadcasting signal including KBS2 broadcasting. A user can watch IPTV real time KBS2 broadcasting.

If the content corresponding to the channel number input by a user exists only in one of the first and second broadcasting signals, then the tuner 111 or internet communication unit 121 receives a broadcasting signal including the content (operation 450). That is, the control unit 160 may control the tuner 111 or internet communication unit 121 such that the broadcasting signal including the content can be received.

More specifically, when the content corresponding to the input channel number is included only in the first broadcasting signal, the control unit 160 provides the tuner 111 with information about a frequency band corresponding to the content to allow a channel corresponding to the content to be selected by the tuner 111.

Also, when the content corresponding to the input channel number is included only in the second broadcasting signal, that is, when the content can be received only through the Internet, the control unit 160 provides the internet communication unit 121 with information about an IP address corresponding to the content of the input channel number to allow the content to be downloaded to the internet communication unit 121.

Referring to FIG. 7, when the channel number 6 is input by a user, the control unit 160 provides the tuner 111 with information about the frequency band (82-88 MHz) of SBS broadcasting corresponding to the channel number 6, and the tuner 111 selects and outputs the channel corresponding to the frequency band (82-88 MHz) in the received first broadcasting signal.

When the channel number 12 is input by a user, the control unit 160 provides the internet communication unit 121 with information about the IP address (444.444.44.444) of XTM broadcasting corresponding to the channel number 12, and the internet communication unit 121 may access the Internet with the IP address (444.444.44.444) and then receive IPTV real time XTM broadcasting.

Figure 9:
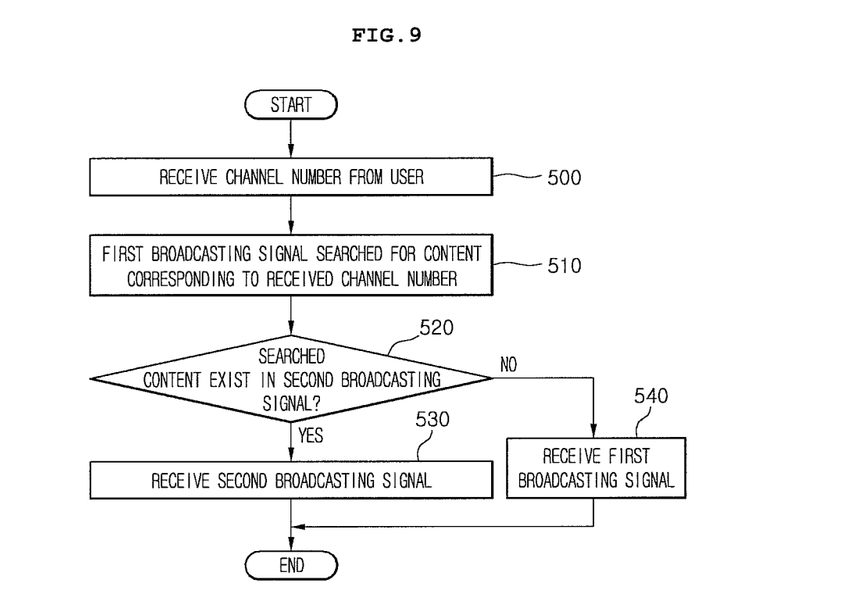
FIG. 9 is a flow chart illustrating a third embodiment of a method of receiving broadcasting signals.

FIG. 9 is a flow chart illustrating a third embodiment of a method of receiving broadcasting signals. The method illustrated in FIG. 9 will be described in connection with a block diagram shown in FIG. 2.

Referring to FIG. 9, a user input unit 170 receives the channel number desired by a user (operation 500). Thereafter, the control unit 160 searches for the content corresponding to the input channel number of contents included in the first broadcasting signal (operation 510).

For example, the storage unit 150 may store a channel map about a first broadcasting signal as shown in FIG. 5, and the control unit 160 may search the storage unit 150 storing the channel map to search for the content corresponding to the input channel number.

The control unit 160 checks whether the content of the first broadcasting signal searched for in operation 510 also exists in the second broadcasting signal (operation 520).

For example, the content summary information of the second broadcasting signal as shown in FIG. 6 may be stored in the storage unit 150. Also, the control unit 160 checks whether the content of the input channel number also exists in the second broadcasting signal, using the content summary information stored in the storage unit 150.

When the content of the input channel number exists in the second broadcasting signal, the internet communication unit 121 accesses the Internet and receives the second broadcasting signal including the content (operation 530). That is, the control unit 160 provides the internet communication unit 121 with the IP address corresponding to the content, and the internet communication unit 121 may access the internet server corresponding to the IP address and download the content.

When the content of the input channel number also exists in the second broadcasting signal, the apparatus for receiving broadcasting signals receives the first broadcasting signal (540 operation). That is, the control unit 160 may provide the tuner with the frequency band corresponding to the content, and the tuner 111 may select and receive the channel corresponding to the frequency band in the first broadcasting signal.

Referring to FIGS. 5 and 6, when a user selects the channel number 9, the content corresponding to the channel number 9 is KBS1 broadcasting, and the KBS broadcasting is the content included in the second broadcasting signal, that is, received through the Internet.

Thus, the control unit 160 may provide the internet communication unit 121 with the IP address (222.222.22.222) corresponding to the KBS1 broadcasting, and the internet communication unit 121 may access the Internet with the IP address (222.222.22.222) and receive IPTV real time KBS1 broadcasting.

The broadcasting signal received as above may be input to the display unit 200, and the display unit 200 may display the content included in the broadcasting signal.

For example, the display unit 200 is described in FIG. 2 as being implemented in connection with the tuner 111 and the internet communication unit 121, but the present invention is not limited thereto.

As shown in FIG. 2, the display device may be implemented in connection with the apparatus for receiving broadcasting signals as one set, and unlike this, the display unit 200 may be implemented as a display device outside the apparatus for receiving broadcasting signals.

In this case, the apparatus for broadcasting signals may perform certain image or sound processing on the received broadcasting signal and then transmit the signal to the display device connected to the outside.

The apparatus for receiving broadcasting signals according to an embodiment may transmit image or sound signals to the external display signal by using a wireless communication, and more particularly, transmit a signal to be transmitted to the display device by using a communication method for wireless transmission of image signals such as Wi-HD or Wi-Fi.

Also, the method of receiving broadcasting signals according to an embodiment may be implemented by a program to be executed in a computer and then stored in a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can also be distributed over network coupled computer systems so that the computer readable code is stored and executed in a distributed fashion. Also, functional programs, codes, and code segments for realizing the method of receiving broadcasting signals can be easily construed by programmers skilled in the art to which the present invention pertains.

According to embodiments, a plurality of broadcast signals which are received through different input ports or communication methods constitute integrated channel information, thereby easily and fast selecting contents desired by a user. And also, the same channel number is allocated to the same content included in different broadcast signals, thereby easily selecting contents in various broadcast signals with a channel number to which a user is accustomed.

While this invention has been particularly shown and described with reference to preferred embodiments thereof, it will be understood by those skilled in the art that various changes in form and details may be made therein without departing from the spirit and scope of the invention as defined by the appended claims, and also the various changes should not be understood departing from the spirit and scope of the invention.

The invention claimed is:

1. A method of receiving broadcasting signals comprising:
    obtaining a channel number of a content included in a first broadcasting signal;
    receiving a content summary information included in a second broadcasting signal, wherein the first and second broadcasting signals are received through different input ports;
    determining, based on the content summary information, whether a content included in the second broadcasting signal is a same content as the content included in the first broadcasting signal;
    allocating the obtained channel number to the content included in the second broadcasting signal when the content included in the second broadcasting signal is determined to be the same content as the content included in the first broadcasting signal;
    selecting one of the first broadcast signal and the second broadcasting signal; and
    receiving a selected broadcasting signal,
    wherein receiving the selected broadcasting signal includes:
        receiving a user input for inputting the channel number corresponding to a currently watched content included in the first broadcasting signal,
        selecting, based on the user input, the second broadcasting signal as a broadcasting signal to be received when the currently watched content is included in the second broadcasting signal, and
        receiving the second broadcasting signal to obtain the currently watched content.

2. The method according to claim 1, wherein the first and second broadcasting signals are received using different communication methods.

3. The method according to claim 1, wherein the content is allocated to the first broadcasting signal for each frequency band.

4. The method according to claim 1, wherein the content is allocated to the second broadcasting signal for each internet protocol (IP) address.

5. The method according to claim 1, wherein a frequency band of the first broadcasting signal and an internet protocol (IP) address of the second broadcasting signal correspond to the same channel number.

6. The method according to claim 1, wherein the obtaining of the channel number comprises:

extracting channel information from the first broadcasting signal; and obtaining the channel number of the content included in the first broadcasting signal from the extracted channel information.

7. The method according to claim 1, wherein the second broadcasting signal is received through the Internet, and using at least one of RSS (Really Simple Syndication) data and ATOM data of the received second broadcasting signal, whether the content is included in the second broadcasting signal is determined.

8. The method according to claim 1, wherein the selecting of the broadcasting signal receives any one of the first and second broadcasting signals from a user.

9. The method according to claim 1, wherein the selecting of the broadcasting signal selects any one of the first and second broadcasting signals according to a preset priority.

10. The method according to claim 9, wherein a broadcasting signal being currently received among the first and second broadcasting signals has the priority.

11. The method according to claim 9, wherein a broadcasting signal having a content with higher resolution among the first and second broadcasting signals has the priority.

12. The method according to claim 9, wherein the priority is set by a user.

13. An apparatus for receiving broadcasting signals comprising:

a first receiving unit to receive a first broadcasting signal through a first input port;

a second receiving unit to receive a second broadcasting signal through a second input port different than the first input port, wherein the second broadcasting signal includes a content summary information;

a storage unit to store a plural contents each corresponding to at least one of the channel number;

a control unit to: obtain a channel number of a content included in the first broadcasting determine, based on the content summary, information, whether a content included in the second broadcasting signal is a same content as the content included in the first broadcasting signal, allocate the obtained channel number to the content included in the second broadcasting signal when the content included in the second broadcasting signal is determined to be the same content as the content included in the first broadcasting signal, receive a user input for inputting the channel number corresponding to a currently watched content included in the first broadcasting signal, select, based on the received user input, the second broadcasting signal as a broadcasting signal to be received when the currently watched content is included in the second broadcasting signal, and receive the second broadcasting signal to obtain the currently watched content.

14. The apparatus according to claim 13, wherein the first and second receiving units receive the first and second broadcasting signals, respectively, using different communication methods.

15. The apparatus according to claim 13, wherein the content is allocated to the first broadcasting signal for each frequency band and to the second broadcasting signal for each Internet Protocol (IP) address.

16. The apparatus according to claim 15, wherein the storage unit stores the channel number of the content corresponding to an internet protocol (IP) address of the second broadcasting signal and a frequency band of the first broadcasting signal allocated to the content.

17. A display device comprising the apparatus according to claim 13.

* * * * *